United States Patent
Oh et al.

(10) Patent No.: US 8,946,950 B2
(45) Date of Patent: Feb. 3, 2015

(54) PULLING PLATE FOR SPINDLE MOTOR AND SPINDLE MOTOR HAVING THE SAME

(75) Inventors: Song Bon Oh, Gyunggi-do (KR); Jong Ryeol Oh, Seoul (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 337 days.

(21) Appl. No.: 13/444,246

(22) Filed: Apr. 11, 2012

(65) Prior Publication Data

US 2013/0127281 A1    May 23, 2013

(30) Foreign Application Priority Data

Nov. 17, 2011    (KR) .................. 10-2011-0120231

(51) Int. Cl.
*H02K 5/24*    (2006.01)

(52) U.S. Cl.
USPC .............................. 310/51; 310/67 R; 310/90

(58) Field of Classification Search
USPC .............................. 310/90, 51, 67 R; 384/100
See application file for complete search history.

(56) References Cited

U.S. PATENT DOCUMENTS

| | | | |
|---|---|---|---|
| 7,830,049 B2 * | 11/2010 | Yoneda et al. ................ | 310/51 |
| 2007/0001531 A1 * | 1/2007 | Nagai ...................... | 310/156.04 |
| 2008/0129139 A1 | 6/2008 | Wakitani et al. | |
| 2011/0134566 A1 * | 6/2011 | Sekii et al. ................. | 360/99.08 |

FOREIGN PATENT DOCUMENTS

| | | |
|---|---|---|
| JP | 62-2833 | 1/1987 |
| JP | 7-163099 | 6/1995 |
| JP | 9-46946 | 2/1997 |
| JP | 11-102569 | 4/1999 |
| JP | 2005-155685 | 6/2005 |
| JP | 2006-166637 | 6/2006 |
| JP | 2006-353082 | 12/2006 |
| JP | 2008-109793 | 5/2008 |
| JP | 2010-154612 | 7/2010 |

OTHER PUBLICATIONS

Korean Office Action issued Oct. 25, 2012 in corresponding Korean Patent Application No. 10-2011-0120231.
Japanese Office Action mailed Nov. 19, 2013 in corresponding Japanese Application No. 2012-089916.

* cited by examiner

*Primary Examiner* — Hanh Nguyen (57) ABSTRACT

There is provided a pulling plate for a spindle motor, the pulling plate including: a body having a circular ring shape; and a plastic deformation part protruding upwardly from the body and plastically deformed when being mounted. Since the pulling plate is installed in the base member by deforming the plating deformation part, a coupling strength between the pulling plate and the base member may be improved. In addition, since the pulling plate may be installed in the base member only through the deformation of the plastic deformation part, an amount of deformation may be reduced. Further, contamination generated in the case that the puling plate clips the base member may be reduced as compared to a case in which the entire pulling plate is press-fitted into the base member.

10 Claims, 6 Drawing Sheets

PULLING PLATE FOR SPINDLE MOTOR AND SPINDLE MOTOR HAVING THE SAME

CROSS-REFERENCE TO RELATED APPLICATIONS

This application claims the priority of Korean Patent Application No. 10-2011-0120231 filed on Nov. 17, 2011, in the Korean Intellectual Property Office, the disclosure of which is incorporated herein by reference.

BACKGROUND OF THE INVENTION

1. Field of the Invention

The present invention relates to a pulling plate for a spindle motor and a spindle motor having the same.

2. Description of the Related Art

Demand for an increase in data reading and writing speed in a spindle motor for a hard disk drive, mounted in a personal computer or a peripheral device, along with demand for a decrease in vibrations, noise, and power consumption in a spindle motor, in accordance with an increase in recording density, has recently increased.

In addition, demand for a decrease in an influence of cogging torque, which is a cause of an increased vibrations, noise, and current consumption during the operation of the spindle motor, the suppression of overcurrent, and a decrease in current consumed by the motor has increased.

At the same time, the suppression of unnecessary vibrations, generated in a thrust direction of a rotor, has also been demanded.

To this end, a pulling plate is installed in a base member. That is, the pulling plate is installed in the base member so as to be disposed under a driving magnet.

Meanwhile, according to the related art, the pulling plate is fixedly installed on the base member by an adhesive. However, in the case in which the pulling plate is installed through the adhesive as described above, when a temperature change is generated, adhesive strength of the pulling plate is deteriorated due to a difference between coefficients of linear expansion of individual materials.

In addition, in the case in which the pulling plate is installed in the base member through press-fitting, a thickness of the pulling plate is thin, such that the pulling plate is deformed at the time of press-fitting thereof. At the time of the installation of the pulling plate through press-fitting, the pulling plate clips the base member to generate particles, such that contamination may occur due thereto.

SUMMARY OF THE INVENTION

An aspect of the present invention provides a pulling plate for a spindle motor having improved coupling strength, and a spindle motor having the same.

Another aspect of the present invention provides a pulling plate for a spindle motor having a reduced amount of deformation at the time of coupling thereof, and a spindle motor having the same.

Another aspect of the present invention provides a pulling plate for a spindle motor, reducing generation of contamination at the time of installation thereof, and a spindle motor having the same.

According to an aspect of the present invention, there is provided a pulling plate for a spindle motor, the pulling plate including: a body having a circular ring shape; and a plastic deformation part protruding upwardly from the body and plastically deformed when being mounted.

The plastic deformation part may be formed as a protrusion protruding upwardly.

The plastic deformation part may have a semicircular cross section before being installed.

The plastic deformation part may include a plurality of plastic deformation parts spaced apart from each other in a circumferential direction.

The plurality of plastic deformation parts may be disposed to be spaced apart from each other by an angle of 120 degrees.

The pulling plate may further include an extension part extended from a portion of the body, on which the plastic deformation part is formed, in an outer radial direction.

According to another aspect of the present invention, there is provided a spindle motor including: a base member having a sleeve fixedly installed therein; a rotor hub fixedly installed on a shaft rotatably supported by the sleeve to thereby rotate; a driving magnet fixedly installed on the rotor hub; and a pulling plate installed in the base member so as to be disposed under the driving magnet, wherein the pulling plate includes a body having a circular ring shape, and a plastic deformation part protruding upwardly from the body and plastically deformed when being mounted.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components therein, but those are to be construed as being included in the spirit of the present invention.

Further, when it is determined that a detailed description of the known art, related to the present invention, may obscure the gist of the present invention, the detailed description thereof will be omitted.

Figure 1:
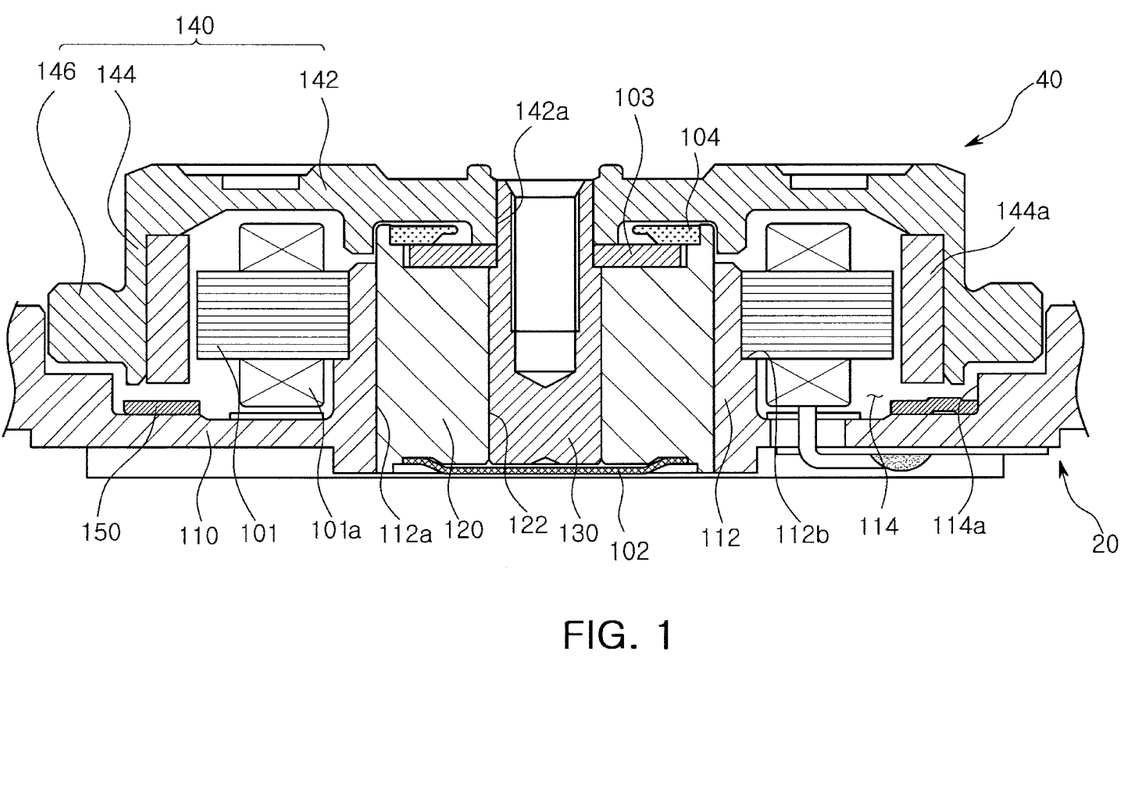
FIG. 1 is a schematic cross-sectional view showing a spindle motor according to an embodiment of the present invention.
Figure 2:
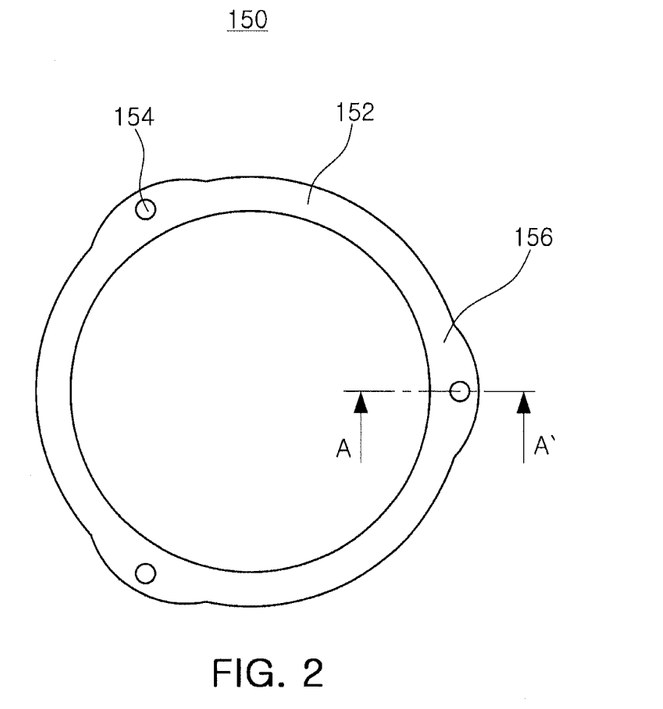
FIG. 2 is a plan view showing a pulling plate for a spindle motor according to an embodiment of the present invention.

FIG. 1 is a schematic cross-sectional view showing a spindle motor according to an embodiment of the present invention; FIG. 2 is a plan view showing a pulling plate for a spindle motor according to an embodiment of the present invention; and FIG. 3 is an enlarged cross-sectional view taken along line A-A' of FIG. 2.

Figure 3:
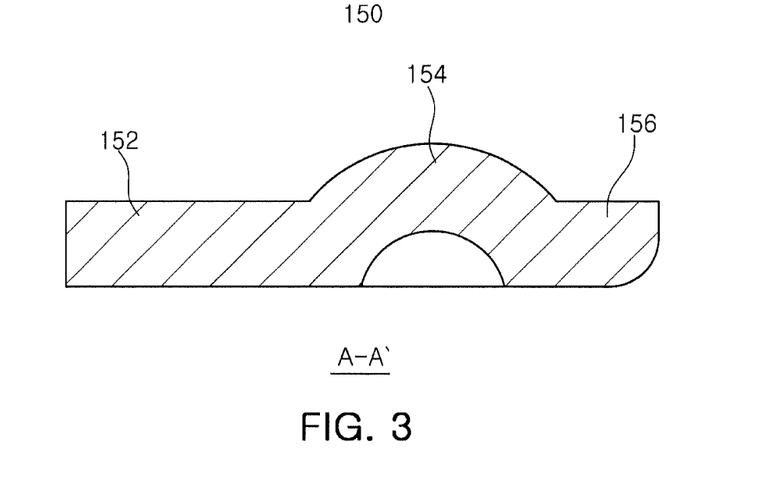
FIG. 3 is an enlarged cross-sectional view taken along line A-A' of FIG. 2.

Referring to FIGS. 1 through 3, a spindle motor 100 according to an embodiment of the present invention may include a base member 110, a sleeve 120, a shaft 130, a rotor hub 140, and a pulling plate 150.

Meanwhile, the spindle motor 100 according to the embodiment of the present invention may be a motor applicable to a hard disk drive rotating a recording disk.

Here, terms with respect to directions will be defined. As viewed in FIG. 1, an axial direction refers to a vertical direction, that is, a direction from an upper portion of the shaft 130 toward a lower portion thereof or a direction from the lower portion of the shaft 130 toward the upper portion thereof, and a radial direction refers to a horizontal direction, that is, a direction from an outer peripheral surface of the rotor hub 140 toward the shaft 130 or from the shaft 130 toward the outer peripheral surface of the rotor hub 140.

In addition, a circumferential direction refers to a rotation direction along the outer peripheral surfaces of the rotor hub 140 and the shaft 130.

Meanwhile, the spindle motor 100 according to the embodiment of the present invention may be mainly constituted of a stator 20 and a rotor 40. The stator 20 includes fixed members rotatably supporting the rotor 40, and the rotor 40 includes rotating members supported by the stator 20 to thereby rotate.

The base member 110 is a fixed member rotatably supporting the rotor 40 and forms the stator 20. In addition, the base member 110 may include an installation part 112 having the sleeve 120 fixedly installed therein.

The installation part 112 may be protruded upwardly in the axial direction and include an installation hole 112a formed therein such that the sleeve 120 may be insertedly installed therein.

That is, the sleeve 120 may be fixedly installed in the installation part 112.

Meanwhile, the installation part 112 may include a step part 112b provided on an outer peripheral surface thereof such that the stator core 101 may be fixed thereto. That is, the stator core 101 may be fixedly installed on the installation part 112 in a state in which it is seated on the step part 112b formed on the outer peripheral surface of the installation part 112.

In addition, the base member 110 may include an insertion groove 114 formed therein. The insertion groove 114 may be formed by being depressed from an upper surface of the base member 110.

The sleeve 120 together with the base member 110 is a fixed member of the stator 20 and rotatably supports the rotor 40.

In addition, the sleeve 120 may be fixedly installed on the installation part 112 as described above. That is, the sleeve 120 may have a through-hole 122 formed in the center thereof, and the shaft 130 may be inserted into the through-hole 122 to thereby be rotatably supported by the sleeve 120.

Meanwhile, a cover member 102 may be installed on a lower surface of the sleeve 120 in order to prevent leakage of a lubricating fluid.

The shaft 130 is a rotating member of the rotor 40 rotatably supported by the stator 20 to thereby rotate.

In addition, the shaft 130 may be rotatably supported by the sleeve 120 as described above. That is, the shaft 130 may be insertedly installed in the through-hole 122 of the sleeve 120. Here, the outer peripheral surface of the shaft 130 and an inner peripheral surface of the sleeve 120 are disposed to be spaced apart from each other by a predetermined interval to thereby form a bearing clearance therebetween.

In addition, this bearing clearance may be filled with the lubricating fluid so as to generate fluid dynamic pressure at the time of rotation of the shaft 130.

Meanwhile, a dynamic pressure generating groove (not shown) may be formed in at least one of the outer peripheral surface of the shaft 130 and the inner peripheral surface of the sleeve 120 such that it pumps the lubricating fluid at the time of the rotation of the shaft 130 to thereby generate fluid dynamic pressure.

That is, the fluid dynamic pressure supporting the shaft 130 is generated by the dynamic pressure generating groove at the time of the rotation of the shaft 130, thereby allowing the shaft 130 to more stably rotate.

Meanwhile, a bearing clearance may also be formed by the sleeve 120 and the cover member 102. The bearing clearance formed by the sleeve 120 and the cover member 102 is also filled with the lubricating fluid.

In addition, in the case in which the shaft 130 is installed in the sleeve 120, a lower surface of the shaft 130 may contact an upper surface of the cover member 102. Subsequently, in the case in which the shaft 130 rotates, the lubricating fluid flows between the sleeve 120 and the cover member 102 to thereby allow the shaft 130 to be floated at a predetermined height.

Further, a thrust plate 103 may be installed on an upper end portion of the shaft 130. In addition, the thrust plate 103 may be fixedly installed on the shaft 130 so as to be disposed to face an upper surface of the sleeve 120.

Therefore, the thrust plate 103 may rotate together with the shaft 130 at the time of rotation of the shaft 130. In other words, the thrust plate 103 together with the shaft 130 is a rotating member of the rotor 40.

Meanwhile, a cap member 104 is disposed on an upper portion of the thrust plate 103 so as to face the thrust plate 103. In addition, the cap member 104 may be installed in the sleeve 120. In other words, the cap member 104 is a fixed member of the stator 20 installed in the sleeve 120.

Furthermore, an interface between the lubricating fluid and the air may be formed by a lower surface of the cap member 104 and an upper surface of the thrust plate 103. To this end, the cap member 104 may have an inclined surface formed at a distal end portion of the lower surface thereof.

That is, an interface between the lubricating fluid filling the above-mentioned bearing clearance and the air may be formed in a space formed by the lower surface of the cap member 104 and the upper surface of the thrust plate 103 by a capillary phenomenon.

The rotor hub 140 may be fixedly installed on the shaft 130 rotatably supported by the sleeve 120 and rotate. That is, the rotor hub 140 is a rotating member rotating together with the shaft 130 and forms the rotor 40. The rotor hub 140 may be fixedly installed on the shaft 130 so as to be disposed on the thrust plate 103.

In addition, the rotor hub 140 may include a disk-shaped rotor hub body 142 having a mounting hole 142a formed therein, the mounting hole 142a having the shaft 130 penetrating therethrough, a magnet installation part 144 extended downwardly from an edge of the rotor hub body 142 in the axial direction, and a disk seating part 146 extended from a distal end of the magnet installation part 144 in the outer radial direction.

That is, the cup-shaped rotor hub 140 may form an internal space together with the base member 110. In addition, a stator core 101 may be disposed in the internal space formed by the rotor hub 140 and the base member 110.

In addition, a driving magnet 144a may be fixed to the magnet installation part 144. That is, the driving magnet 144a may be fixedly installed on the inner peripheral surface of the magnet installation part 144 so as to be disposed to face an edge of the stator core 101.

In addition, the driving magnet 144a may have an annular ring shape and be a permanent magnet generating magnetic force having a predetermined strength by alternately magnetizing N and S poles in the circumferential direction. That is, the driving magnet 144a may serve to generate driving force for rotating the rotor hub 140.

In other words, when power is supplied to a coil 101a wound around the stator core 101, driving force capable of rotating the rotor hub 140 may be generated by electromagnetic interaction between the stator core 101 having the coil 101a wound therearound and the driving magnet 144a, and accordingly, the rotor hub 140 can rotate.

As a result, the shaft 130 and the thrust plate 103 fixedly installed on the shaft 130 may also rotate by the rotation of the rotor hub 140.

When the rotor hub 140 rotates as described above, the lubricating fluid filling the bearing clearance may be pumped by the dynamic pressure generating groove. Therefore, the fluid dynamic pressure is generated to thereby float the rotor 40 at a predetermined height while supporting the rotation of the shaft 130.

The pulling plate 150 may be installed in the base member 110 so as to be disposed under the driving magnet 144a. That is, the pulling plate 150 may be insertedly mounted in the insertion groove 114 of the base member 110 and be disposed under the driving magnet 144a.

In addition, as shown in FIGS. 2 and 3, the pulling plate 150 may include a body 152 having a circular ring shape, and a plastic deformation part 154 protruding upwardly from the body 152 and plastically deformed when being mounted, and an extension part 156 extended from a portion of the body 152 on which the plastic deformation part 154 is formed in the outer radial direction.

The body 152 has a circular ring shape so as to correspond to that of the driving magnet 144a.

In addition, the plastic deformation part 154 may be formed as a protrusion protruding upwardly. That is, the plastic deformation part 154 formed as the protrusion is deformed, such that the pulling plate 150 may be fixedly installed in the installation groove 114 of the base member 110.

The detailed description thereof will be provided below.

In addition, the plastic deformation part 154 may be formed as a protrusion having a semicircular cross section before the pulling plate 150 is installed in the base member 110. However, the plastic deformation part 154 is not limited to having the above-mentioned shape, but may also have any shape as long as it may be deformed by pressing. That is, the plastic deformation part 154 may also have, for example, an elliptical shape.

Meanwhile, a plurality of plastic deformation parts may be disposed to be spaced apart from each other in the circumferential direction.

In addition, the plastic deformation parts 154 may be disposed to be spaced apart from each other by an angle of 120 degrees.

That is, when the pulling plate 150 is installed in the base member 110, a center line of the pulling plate 150 is not eccentric with respect to that of the installation hole 112a.

However, in the case of installing the pulling plate 150 in the base member 110 by deforming the plastic deformation parts 154 in a state in which the plastic deformation parts 154 are seated in the insertion groove 114 of the base member 110, the center line of the pulling plate 150 may be eccentric with respect to that of the installation hole 112a of the base member 110.

However, since the plastic deformation parts 154 are disposed to be spaced apart from each other by an angle of 120 degrees, the generation of the eccentricity may be reduced while an amount of deformation of the pulling plate 150 is reduced.

Although the plastic deformation parts 154 in the present embodiment are formed as three protrusions spaced apart from each other by an angle of 120 degrees, the present invention is not limited thereto.

That is, the number and angle of the plastic deformation parts 154 may be varied.

Meanwhile, the extension parts 156 may be extended from portions of the body 152 on which the plastic deformation parts 154 are formed in the outer radial direction. That is, the extension part 156 may be protruded from an outer peripheral surface of the body 152 and have an arc-shaped outer peripheral surface.

As a result, the extension parts 156 may also be disposed to be spaced apart from each other by an angle of 120 degrees.

In addition, the extension part 156 may contact a sidewall 114a forming the insertion groove 114 of the base member 110 by the deformation of the plastic deformation part 154.

That is, at the time of the deformation of the plastic deformation part 154, the extension part 156 may move in the outer radial direction to thereby be press-fitted into the sidewall 114a forming the insertion groove 114 of the base member 110.

Therefore, the pulling plate 150 may be fixedly installed in the base member 110.

As described above, since the extension part 156 may be press-fitted into the sidewall 114a forming the insertion groove 114 of the base member 110 by the deformation of the plastic deformation part 154 to thereby install the pulling plate 150 in the base member 110, a coupling strength between the pulling plate 110 and the base member 110 may be improved.

That is, deterioration in adhesion strength caused by cracking in an applied adhesive due to a difference in thermal expansion between materials according to a temperature change may be prevented.

In addition, since the pulling plate 150 may be installed in the base member 110 only through the deformation of the plastic deformation part 154, an amount of deformation may be reduced as compared to a case in which the entire pulling plate 150 is press-fitted into the base member 110.

Further, contamination generated in the case that the puling plate 150 clips the base member 110 may be reduced as compared to a case in which the entire pulling plate 150 is press-fitted into the base member 110.

In other words, since the generation of particles at the time of the installation of the pulling plate 150 may be reduced, the contamination of the particles may be reduced.

Hereinafter, a process of installing a pulling plate for a spindle motor according to an embodiment of the present invention will be described with reference to the accompanying drawings.

FIGS. 4 through 7 are views describing a process of installing a pulling plate for a spindle motor according to an embodiment of the present invention.

Figure 4:
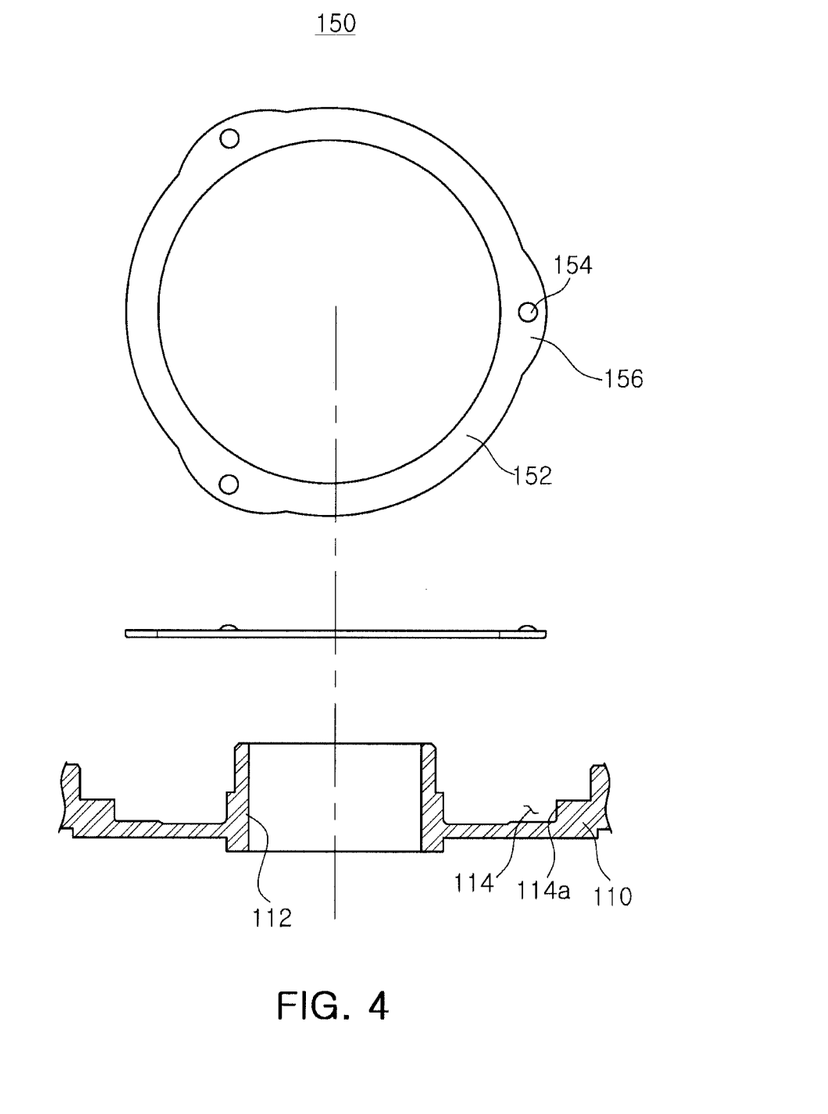
FIGS. 4 through 7 are views describing a process of installing a pulling plate for a spindle motor according to an embodiment of the present invention.
Figure 5:
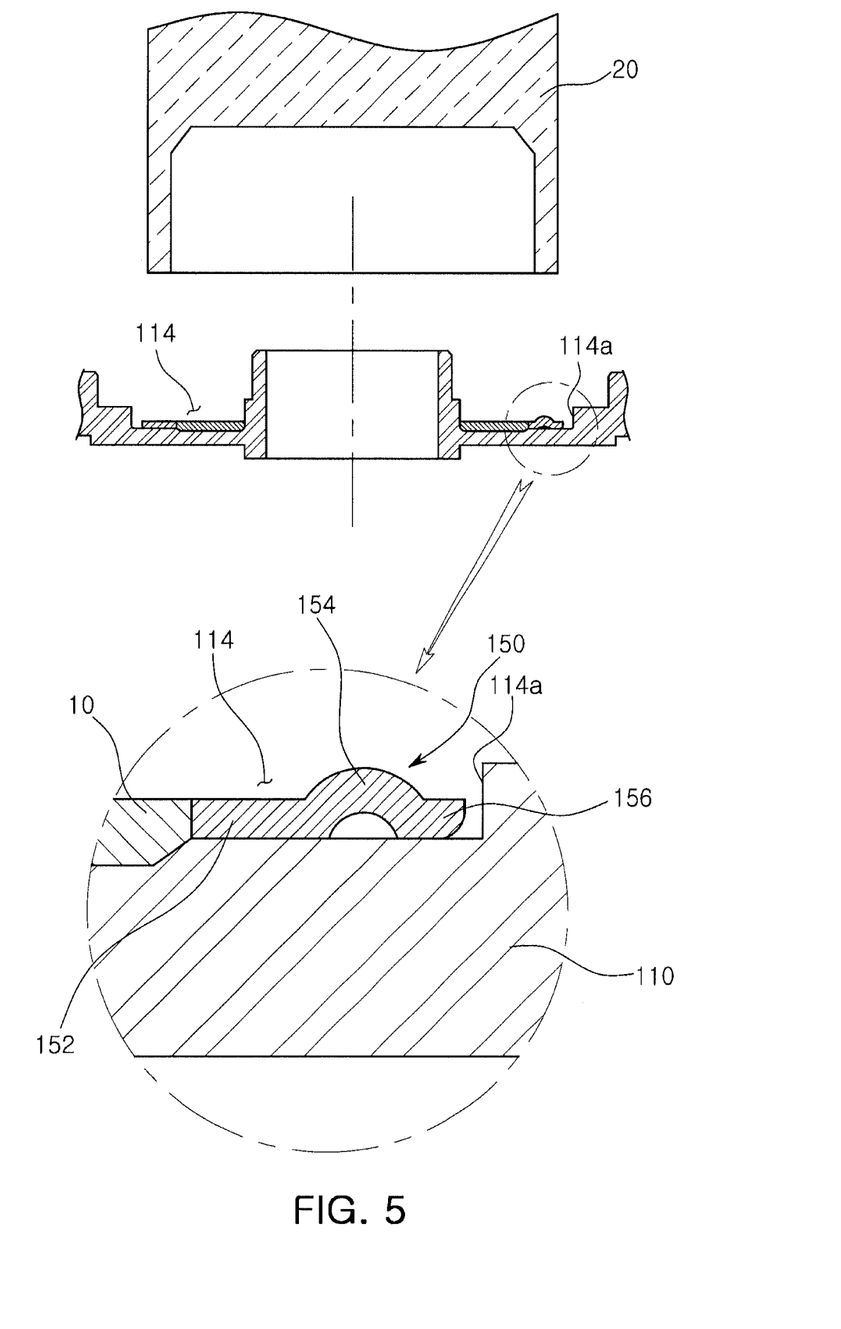
Figure 6:
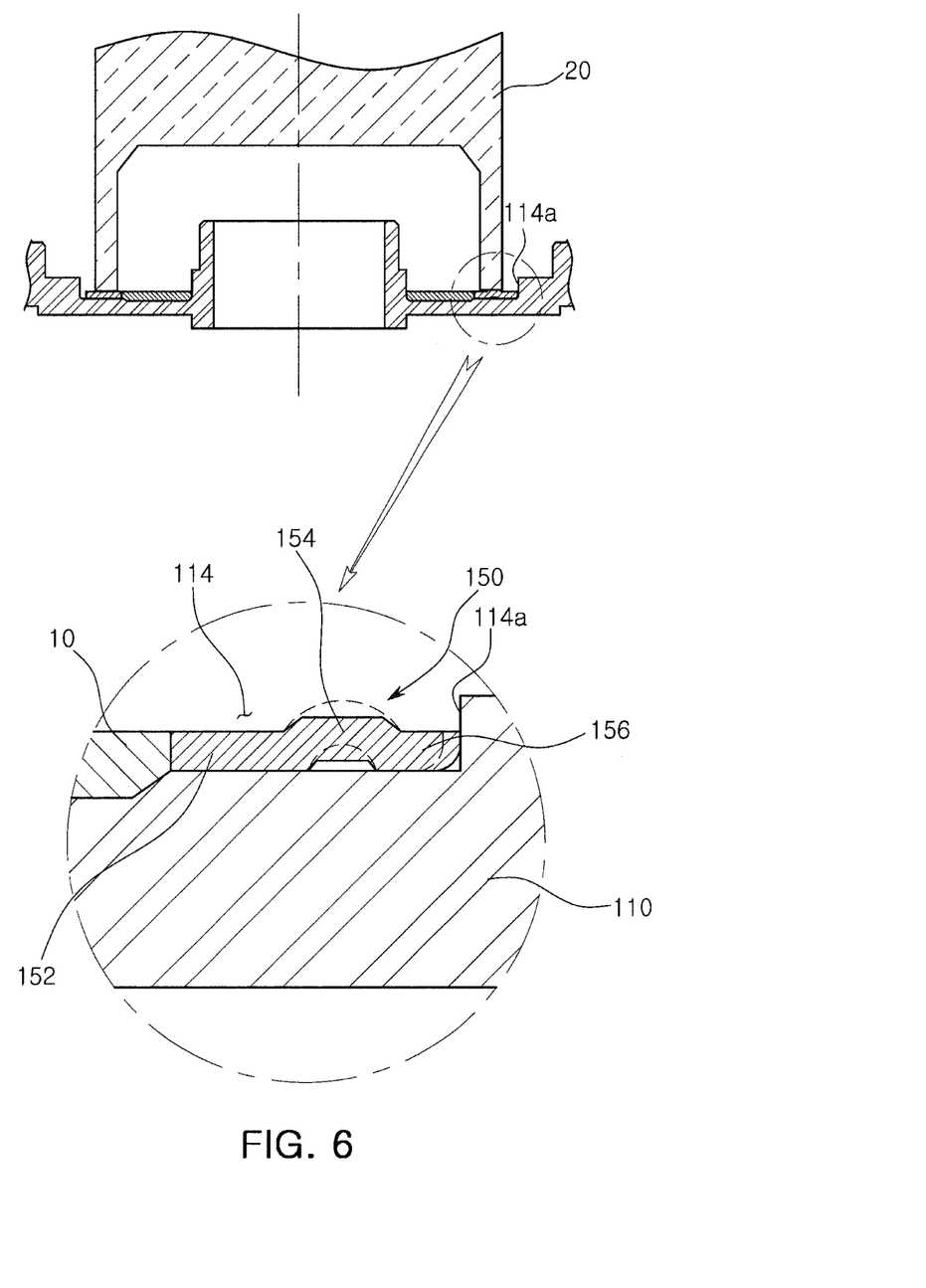
Figure 7:
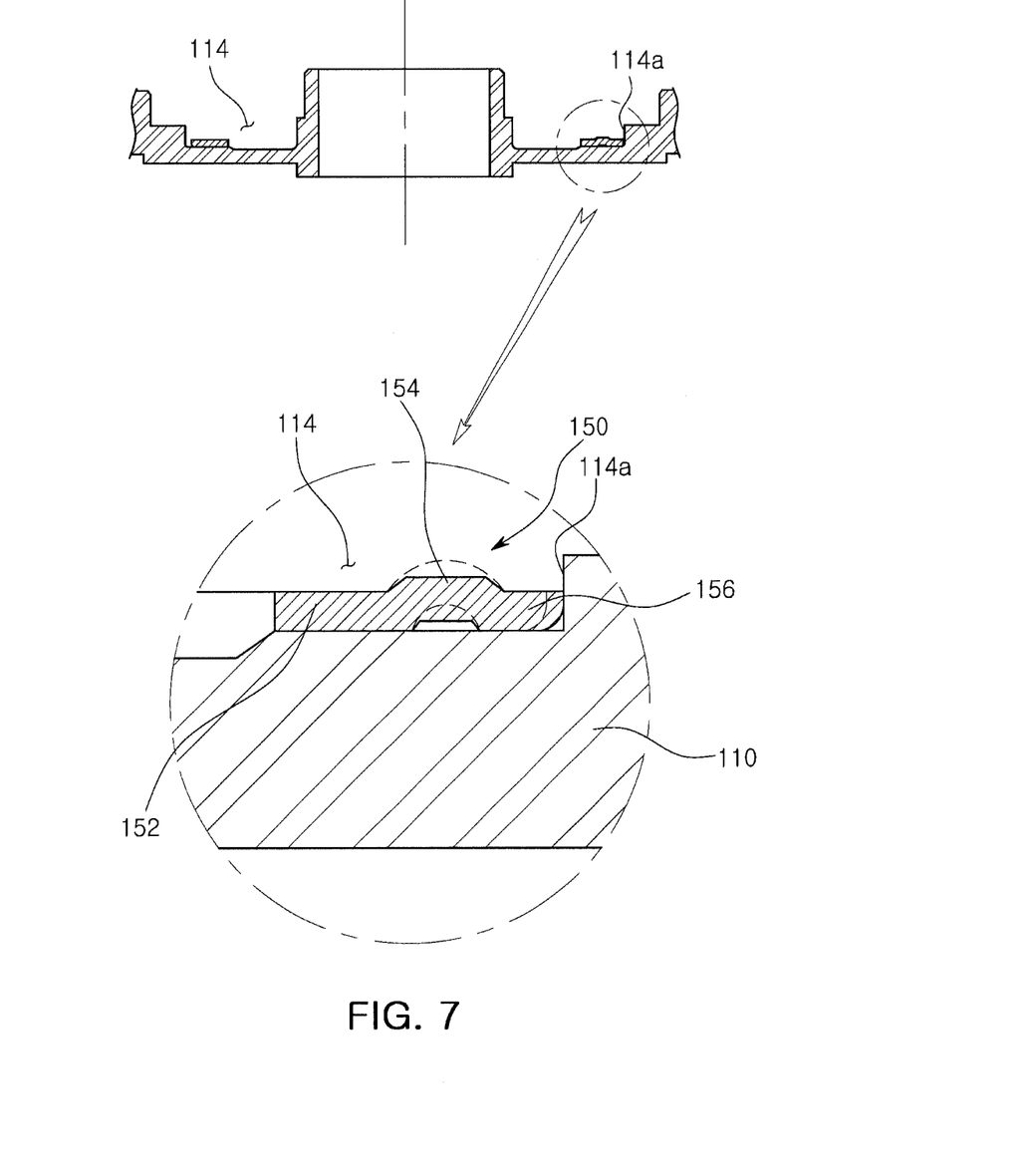

More specifically, FIG. 4 shows preparing a base member and a pulling plate for a spindle motor according to the embodiment of the present invention; FIG. 5 shows seating the pulling plate for a spindle motor in the base member; FIG. 6 shows pressing the pulling plate for a spindle motor through an installation jig; and FIG. 7 shows a state in which the pulling plate for a spindle motor is installed in the base member.

First, as shown in FIG. 4, the base member 110 and the pulling plate 150 are prepared.

Then, as shown in FIG. 5, the pulling plate 150 is seated in the insertion groove 114 of the base member 110. Meanwhile, before the pulling plate 150 is seated in the insertion groove 114 of the base member 110, an installation auxiliary member 10 for installing the pulling plate 150 may be mounted in the insertion groove 114 of the base member 110.

Thereafter, the pulling plate 150 is seated in the insertion groove 114 such that an inner peripheral surface of the body 152 thereof contacts an outer peripheral surface of the installation auxiliary member 10.

At this time, the extension part 156 of the pulling plate 150 may be disposed to be spaced apart from the sidewall 114a of the insertion groove 114 as described in FIG. 5.

Next, as shown in FIG. 6, a jig 20 descends to thereby deform the plastic deformation part 154 of the pulling plate 150.

Therefore, as shown in FIG. 7, the plastic deformation part 154 is deformed, and the extension part 156 moves toward the outer radial direction to thereby contact the sidewall 114a of the insertion groove 114. At this time, the plastic deformation part 154 is deformed such that the extension part 156 is press-fitted into the sidewall 114a.

As a result, the pulling plate 150 may be fixedly installed in the insertion groove 114 of the base member 110 by the deformation of the plastic deformation part 154.

Then, the installation auxiliary member 10 is removed from the base member 110.

As described above, since the extension part 156 may be press-fitted into the sidewall 114a forming the insertion groove 114 of the base member 110 by the deformation of the plastic deformation part 154 to thereby install the pulling plate 150 in the base member 110, coupling strength between the pulling plate 110 and the base member 110 may be improved.

That is, deterioration in adhesion strength caused by cracking in an applied adhesive due to a difference in thermal expansion between materials according to a temperature change may be prevented.

In addition, since the pulling plate 150 may be installed in the base member 110 only through the deformation of the plastic deformation part 154, an amount of deformation may be reduced as compared to a case in which the entire pulling plate 150 is press-fitted into the base member 110.

Further, contamination generated in the case that the puling plate 150 clips the base member 110 may be reduced as compared to a case in which the entire pulling plate 150 is press-fitted into the base member 110.

In other words, since the generation of particles at the time of installation of the pulling plate 150 may be reduced, the contamination of the particles may be reduced.

As set forth above, according to embodiments of the present invention, since a pulling plate may be installed in a base member by deforming a plating deformation part, a coupling strength between the pulling plate and the base member may be improved.

In addition, since the pulling plate may be installed in the base member only through the deformation of the plastic deformation part, an amount of deformation may be reduced when the pulling plate is coupled to the base member.

Further, contamination generated in the case that the puling plate clips the base member may be reduced as compared to a case in which the entire pulling plate is press-fitted into the base member.

While the present invention has been shown and described in connection with the embodiments, it will be apparent to those skilled in the art that modifications and variations can be made without departing from the spirit and scope of the invention as defined by the appended claims.

What is claimed is:

1. A pulling plate for a spindle motor, the pulling plate comprising:
   a body having a circular ring shape;
   a plastic deformation part protruding upwardly from the body and plastically deformed when being mounted; and
   an extension part extended from a portion of the body, on which the plastic deformation part is formed, in an outer radial direction,
   wherein the extension part moves in an outer radial direction when the plastic deformation part is plastically deformed.

2. The pulling plate of claim 1, wherein the plastic deformation part is formed as a protrusion protruding upwardly.

3. The pulling plate of claim 2, wherein the plastic deformation part has a semicircular cross section before being installed.

4. The pulling plate of claim 1, wherein the plastic deformation part comprises a plurality of plastic deformation parts spaced apart from each other in a circumferential direction.

5. The pulling plate of claim 4, wherein the plurality of plastic deformation parts are disposed to be spaced apart from each other by an angle of 120 degrees.

6. A spindle motor comprising:
   a base member having a sleeve fixedly installed therein;
   a rotor hub fixedly installed on a shaft rotatably supported by the sleeve to thereby rotate;
   a driving magnet fixedly installed on the rotor hub; and
   a pulling plate installed in the base member so as to be disposed under the driving magnet,
   wherein the pulling plate includes
      a body having a circular ring shape,
      a plastic deformation part protruding upwardly from the body and plastically deformed when being mounted, and
      an extension part extended from a portion of the body, on which the plastic deformation part is formed, in an outer radial direction,
      wherein the extension part moves in an outer radial direction when the plastic deformation part is plastically deformed.

7. The spindle motor of claim 6, wherein the plastic deformation part is formed as a protrusion protruding upwardly.

8. The spindle motor of claim 6, wherein the plastic deformation part comprises a plurality of plastic deformation parts spaced apart from each other in a circumferential direction.

9. The spindle motor of claim 8, wherein the plurality of plastic deformation parts are disposed to be spaced apart from each other by an angle of 120 degrees.

10. The spindle motor of claim 6, wherein the plastic deformation part has a semicircular cross section before being installed.

* * * * *